Sept. 8, 1953  M. L. ESMAY ET AL  2,651,143
TERRACED GARDEN
Filed Oct. 9, 1948  3 Sheets-Sheet 1

INVENTORS
Margaret L. Esmay and
Paul O. Esmay
BY
Louis Sheldon
Atty.

Sept. 8, 1953      M. L. ESMAY ET AL      2,651,143
TERRACED GARDEN

Filed Oct. 9, 1948      3 Sheets-Sheet 2

INVENTORS
Margaret L. Esmay and
Paul O. Esmay
BY
Louis Sheldon
Atty.

Sept. 8, 1953     M. L. ESMAY ET AL     2,651,143
TERRACED GARDEN
Filed Oct. 9, 1948     3 Sheets-Sheet 3
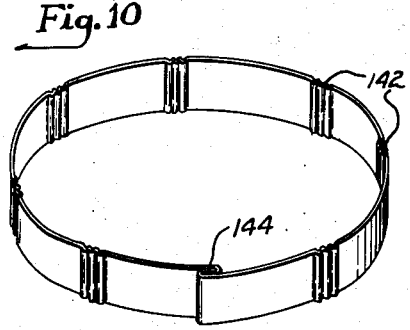
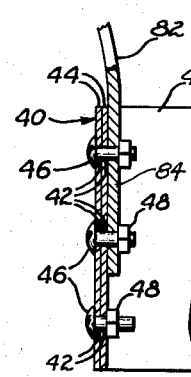
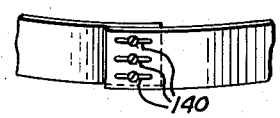
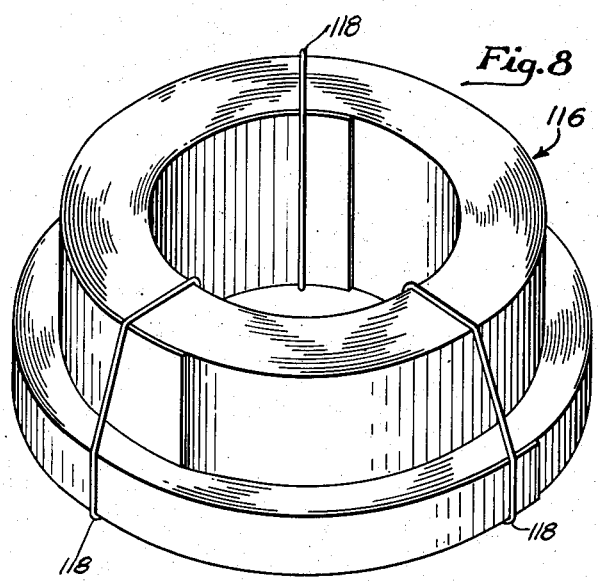
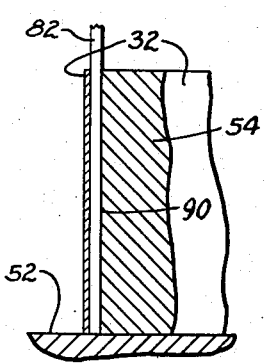
INVENTORS
Margaret L. Esmay and
Paul O. Esmay
BY
Louis Sheldon
Atty.

Patented Sept. 8, 1953

2,651,143

UNITED STATES PATENT OFFICE 2,651,143

TERRACED GARDEN

Margaret L. Esmay and Paul O. Esmay,
Elmhurst, Ill.

Application October 9, 1948, Serial No. 53,746

5 Claims. (Cl. 47—33)

This invention relates to horticulture, and is concerned more particularly with the care and growth of garden plants.

Strawberries and other plants are usually grown in ground patches of such size that it is often impossible for a person to reach the plants substantially removed from the fringes of the patch for weeding, harvesting or picking and other attention, without the necessity for his walking among the plants and the consequent usual destruction or injury of some of them.

To some extent, essentially in the southern part of this country and in other places having warm climates, strawberries have been grown in "strawberry barrels." Such a barrel is filled with soil and its side wall perforated with holes about 2" in diameter and the plants project through the holes. A perforated water pipe located axially within the barrel is provided to introduce moisture to the soil for the roots of the plants. Such a device, although in certain respects more desirable than a patch, has the drawbacks, among others, of precluding some of the plants from receiving sunlight and of affording a very uneven distribution of moisture to the plant roots, as most of the water goes to the bottom, and, moreover, the runners have no soil in which to take root.

It is an object of our invention to provide a garden of such shape and size as to render all plants in the garden accessible to the sun and conveniently accessible to a person standing at the edge of the garden.

Another object is to provide a terraced garden, the plants of which are within easy reach of a person standing outside the garden.

A further object is to provide a garden and irrigation system therefor whereby moisture is substantially uniformly distributed to all of the plant roots.

An additional object is to provide protection for the plants of a garden constructed in accordance with our invention against birds, animals and other destructive creatures and objects.

It is also an object to provide a novel system for distributing fertilizer and other chemicals to promote growth of plant life.

It is another object to provide a garden of the character referred to in which soil upheaval due to frost is precluded.

Prevention of freezing of the soil in a garden of the type under consideration is a further object of our invention.

It is an additional object to provide a garden of this character with protection against the elements.

Another object is to provide a garden in the form of a terraced cone or pyramid or similar form, the apex of which is within convenient reach of a person standing on the ground at the foot of the garden.

It is also an object to provide a terraced conical, pyramidal or similar-shaped garden with means for maintaining the soil of the garden at substantially uniform and optimum temperature.

It is also an object to provide a terraced garden in which the plant bed may be readily and conveniently varied and added to best suit the particular type of plant to be grown.

Further objects and advantages of our invention will appear as the description proceeds.

The invention will be better understood upon reference to the following description and accompanying drawings, in which:

Fig. 2 is a vertical sectional view of the garden, including a protective net and thermostatically controlled electric heating system for the garden.

Fig. 3 is a top plan view of the structure shown in Fig. 2 with the net removed.

Fig. 5 is a sectional view taken as indicated by the line 5—5 in Fig. 3.

Fig. 6 is a sectional view taken as indicated by the line 6—6 in Fig. 3.

Fig. 8 shows the several bands and irrigating pipe rolled into a coil and the several dome-ribs rolled into a separate coil, both coils tied in a compact unit for shipment.

Fig. 9 is a fragmentary isometric view showing a modified connection between the ends of the terrace bands to provide for expansion such as may be caused by upheaval of the soil due to frost.

Fig. 10 is an isometric view of a modified terrace band in which the ends are hooked together and the band is corrugated to allow for expansion caused by soil upheaval due to frost.

Figure 1:
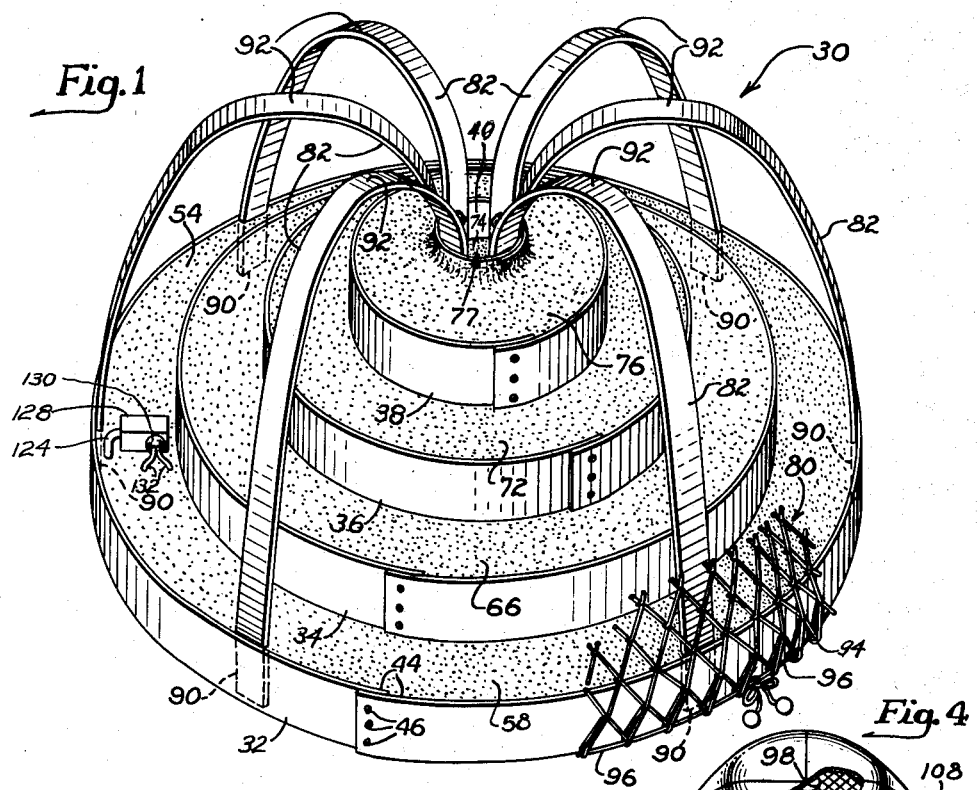
Fig. 1 is an isometric view of a terraced conical garden embodying features of our invention.
Figure 4:
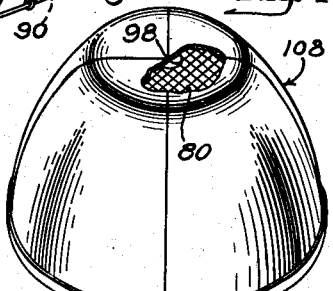
Fig. 4 is an isometric view of the garden protected by a transparent cover.

Referring now more particularly to the drawings, showing illustrative embodiments of the invention, we provide a conical garden indicated generally at 30. In accordance with our invention, apparatus is provided enabling the purchaser thereof to construct a conical garden inexpensively and expeditiously. Such apparatus comprises a plurality of bands 32, 34, 36, 38 and 40 of substantially the same height but of successively reduced length. Although we have shown five of such bands, their number may be varied as desired.

Each such band is adapted to be flexed into substantially cylindrical form and may have holes 42 at its ends 44 for the reception of screws 46 adapted to receive nuts 48 to secure the band in that form. The bands may be of any suitable material, but are preferably of aluminum stock about 6" wide and about 3/32" thick, the longest forming a circle about 6' in diameter and the shortest forming a circle about 8" in diameter.

In constructing the garden, about a cubic yard of good garden or field top soil is needed. All of the bands 32, 34, 36, 38 and 40 are flexed into substantially circular form and the screws 46 and nuts 48 applied to maintain that form. The band 32 is then placed on level ground or any other suitable support 52 and a quantity of soil 54 is placed within the band and trampled or otherwise tamped so as to be packed firmly with its top surface 56 coned so that its apex is a few inches above the level of the top of the band, and the soil is then thoroughly soaked. The band 34 is then placed upon the soil surface 56 in substantially coaxial relation to the band 32, leaving a terrace 58 about 8" wide. Coarse sand is deposited over the entire surface 56 of soil within the band 34 and shaped substantially like a circular tier 60 of a pagoda, with its apex 62 having a diameter of at least about 8" a few inches above the level of the top of the band 34 and a thickness of about ½" from the band 34 inward a substantial distance as shown at 63. Now a quantity of soil 64 is placed on the tier 60, preferably not covering the apex 62, and treated like the first quantity of soil 54. The band 36 is now placed on the surface 65 of the soil 64 in substantially coaxial relation to the band 34, leaving a terrace 66 about 8" wide, coarse sand is placed over the soil surface 65 and the exposed sand apex 62 and shaped into a pagoda tier 67 with its apex 68 having a diameter of at least about 8" a few inches above the level of the top of the band 36 and a thickness of about ½" from the band 36 inward a substantial distance as shown at 69. Another quantity of soil 70 is applied within the band 36 and treated like the quantity 64, the band 38 is placed on the soil surface 71 in substantially coaxial relation to the band 36, leaving a terrace 72 about 8" wide; another tier 73 of coarse sand is formed over the soil surface 71 within the band 38 similar to the other tiers except that the apex 74 terminates slightly above the apex 68, the band 40 is placed about the apex 74 so that said band projects about 3" above the band 38; and soil 75 placed between the bands 38 and 40 and treated like the other quantities of soil, affording a terrace 76 about 8" wide. It will be observed that the several tiers 60, 67 and 73 of coarse sand form in effect a pagoda 77, and that the band 40 extends substantially above the top of the pagoda to provide for the reception of a substantial volume of liquid. The sand herein referred to is a coarse sand through which the irrigation liquid and chemicals will readily seep to the soil.

The various layers of soil are preferably coned as noted above for the reason that the soil tends to settle, so that, when the settling is completed, the terraces will be substantially flat.

The garden is irrigated from time to time, the water, containing, if desired, liquid fertilizer and/or other chemicals, being introduced into the upper end of the band or pipe 40, seeping rapidly through the coarse sand pagoda 77 and thence spreading throughout the soil. We have found this arrangement to satisfactorily distribute adequate moisture throughout the soil in the garden, and to conduce to the growth of long roots in the plants planted in the several terraces.

Since the garden drains into the ground, excessive rains will not create a crop failure. In a conventional strawberry patch, for example, crop failure is sometimes caused by drowning of plants.

The garden may be left as above described, but, for the purpose, among others, of affording protection against birds, rabbits and other animals and objects, we provide a dome-shaped all-weather net 80 and support the same on a circumferential series of, say, six ribs 82 of substantially equal length, each rib comprising a strip of preferably aluminum stock about 2" wide and about 1/16" thick, one rib being secured at one end 84 by the two upper screws 46 and nuts 48 of the top band 40 and the other ribs at the corresponding ends 84 thereof by nuts 86 and screws 88 extending through said band, and each rib at its other end 90 merely by imbedding the same in the soil 54 adjacent the bottom band 32, all of said ribs being preferably uniformly spaced circumferentially and of such length as to be capable of being resiliently bowed convexly upward so that the plane of the tops 92 of the ribs is about 12" above the top of the pipe 40, said ribs thereby adequately clearing fully grown plants on the various terraces. The net 80 is shaped to cover the ribs 82 and the bottom band 32 and has a hem 94 forming a tunnel containing a drawstring 96 by means of which the hem may be drawn tight around said band, the top of the net being adapted to extend inward from the tops 92 of the ribs and terminating in a loop defining an opening 98 adapted to substantially register with the pipe 40. A hose may be conveniently extended through the opening 98 to discharge liquid into the pipe 40. The net 80 may be of any suitable mesh, for example 2".

The net 80 is preferably used principally from about the middle spring to about the middle fall. During the early spring months, in order to improve plant growth, prevent frost damage and make the garden into a hot bed, and, in the late fall months, to protect unharvested fruit and vegetables, we prefer to employ a transparent flexible hood 100 made of polyethylene or other plastic or other suitable material which is pervious to ultra-violet rays, placing the hood over the net 80 or directly on the ribs 82, the bottom hem 110 of the hood having a drawstring 112 by which it may be tightened about the bottom band 32.

The various bolts and nuts are preferably of non-rusting metal, preferably either aluminum or stainless steel, and, if desired, the various bands and ribs could be of aluminum, stainless steel, plastic, composition, or other suitable non-rusting material. Aluminum bands are preferred because of the readiness with which aluminum will lose or radiate solar heat to the air and thus obviate baking of the soil in contact therewith.

It will be noted that the uppermost terrace 76 is only about 2' from the ground or other support 52, that the top of the pipe 40 is only a few inches higher, so that, when the net 80 is removed, the various terraces are conveniently accessible for planting, weeding and other attention and harvesting, and ample soil is available for runners, and that the pipe, either in the presence or absence of the net, is conveniently accessible for supplying liquid thereto. The ribs 82 are far enough apart not to interfere with attention to the plants, and are sufficiently narrow and spaced from the terraces not to substantially prevent adequate sunlight from reaching the plants. The small height and large diameter of the garden insure the sun's rays reaching all plants on each terrace for a considerable period each day.

For protection during the winter against winter kill it is advisable to cover the plants with some such material as straw, leaves or the like, and the net 80 and/or hood 108 can be used to hold the straw in place, or a heavy canvas cover (not shown) may be used.

Figure 7:
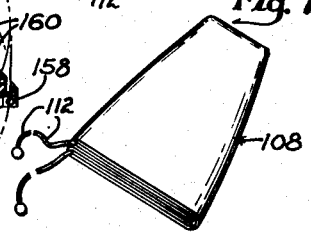
Fig. 7 shows a transparent cover collapsed for shipment or storage.

The various bands and ribs as received by the consumer are preferably in the form of unconnected strips coiled together into a compact package 116 held as by wrapping wires 118, the net 80 and hood 108 may be collapsed and folded substantially as shown in Fig. 7, and the bolts and nuts may be collected in a small sack, so that the whole will occupy small shipping space.

The ribs 82 are preferably coiled to a diameter of about 18" and take a set when coiled so that little flexing is required to readily attach them to the band 40 and imbed them in the soil 54, and they all assume practically the same arched shape when so attached and imbedded, as shown. The bands likewise take a set when coiled, so that they readily flex to and assume a substantially cylindrical shape when their ends are fastened together.

For the purpose of augmenting the heating effect of the sun, we may provide a thermostatically controlled electric soil heating cable apparatus whose energy supply may be that available at the house or other building adjoining the ground or other support on which the garden is located. Such an apparatus may comprise a plug 120 adapted to be plugged in an electric line socket 122, the wiring 124 extending from the plug to a thermostat box 128 which may rest on the lowest terrace 58, said box having a socket for the reception of a plug 130 whose prongs are connected with an attenuated resistance wire or cable 132 arranged with its two halves extending substantially parallel down into the soil 54 of the first terrace, then substantially in circles to the starting points, then inwardly and upward within the band 34, then in circles below the top of the terrace 66 and so on until they meet in the loop 134 adjacent the pipe 40. All wires are of course insulated, and the resistance wire 132 is preferably spaced about 1" from the tops and sides of the respective terraces. The thermostat box 128 and plug 130 will not occupy excessive space on the terrace 58, and the wiring 124 may extend down alongside the inner face of the bottom band 32 and will not interfere with the tightening of the drawstrings of the net 80 and hood 108.

The heating apparatus may be used with the transparent hood 108 in the early spring or to make the garden into a greenhouse for flowers throughout the winter in the Southern States.

The screw holes in the ends of the terrace-confining bands could be longitudinally extended, as shown at 140 (Fig. 9), to allow for expansion due to frost to prevent frost upheavals, or such bands could be corrugated, as shown at 142 (Fig. 10), for that purpose. Moreover, instead of bolting the ends of such bands, they may be looped together and crimped, as shown at 144 (Fig. 10).

Figure 11:
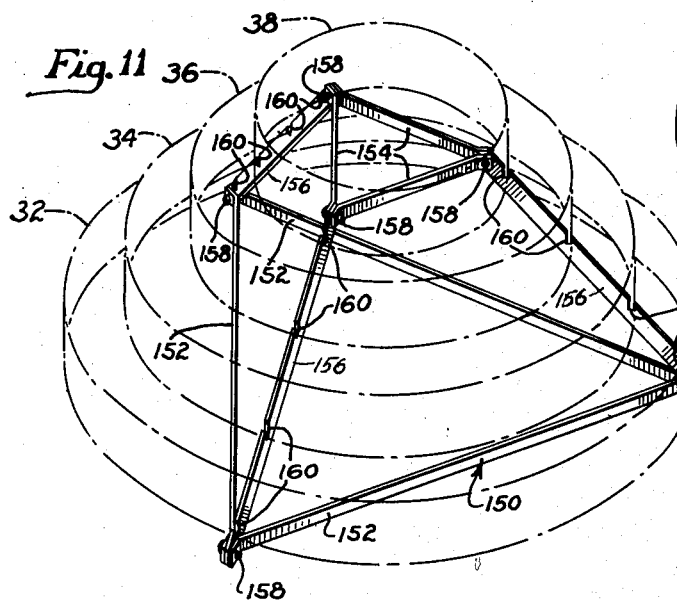
Fig. 11 is an isometric view of a frame for supporting the terraced bands for display purposes, the bands being shown in dot-dash lines.

For the purpose of displaying the invention in a store window or other suitable place, we have provided a stand 150 which may be in the form of a skeleton truncated triangular pyramid including a base adapted to rest on a floor or other support and formed of straps 152, a top formed of shorter straps 154, and struts 156 extending between the straps at the junctures thereof and connected thereto as by bolts and nuts 158. Each strut 156 has vertical slots 160 vertically spaced apart successively a distance substantially equal to the height of the terrace-confining bands 32, 34, 36 and 38, for example 6", said bands being adapted to seat in said slots substantially as shown in Fig. 11. If desired, the stand 150 could be employed in the building of the garden above described.

A garden constructed in accordance with our invention provides a means for introducing additional solar heat in the soil during early spring months which will stimulate the growth of plants; for introducing adequate moisture to the root structure of growing plants with minimum amount of water and effort; for introducing plant food and fertilizer in the water, which in turn carries them directly to the root structure for optimum results with a given amount of material; for promoting maximum plant growth and affording protection in a relatively small ground area; for making easy the tending of the plants and soil and the harvesting of the crop; for taking care of the problem of expansion of soil due to frosting; for permitting adequate root growth while preventing shading any of the plants from the sun; for watering and feeding various plants for maximum growth and protection; and, among other things, provides a means for retaining special soil combinations to facilitate and promote growth and protection of various plants.

The bands above the bottom band, in addition to accomplishing the functions above noted, also provide (before the plants are grown to shield the upper bands from the sun) cylindrical heat-reflection areas which constantly rotate with the sun relative to the garden and disperse and diffuse the heat, due to the convexity of said areas, so that the plants will not be injured by the reflected heat.

It will be appreciated that although we have shown and described in detail a terraced garden in the form of a stepped cone, our invention may be made in the form of a stepped pyramid or other suitable shape.

Various modifications coming within the spirit of our invention may suggest themselves to those skilled in the art, and hence we do not wish to be restricted to the specific forms shown or uses mentioned, except to the extent indicated by the appended claims, which are to be interpreted as broadly as the state of the art may permit.

We claim:

1. A terraced garden including a plurality of soil steps of downward progressively increasing outward lateral extent, at least the outer portion of each step being exposed at the top thereof, sand portions of downward progressively increasing outward lateral extent individually underlying and in intimate surface contact with the soil of the respective outer step portions, and means for supplying liquid to said sand portions for seepage through the sand to the soil of the respective outer step portions.

2. A terraced garden including a plurality of substantially annular soil steps of downward progressively increasing outward lateral extent and having outer substantially annular portions exposed at the tops thereof, and a sand core contiguous to the inner edge soil surfaces of said steps, said core having sand portions of downward progressively increasing outward lateral extent individually underlying and contiguous to the soil of the respective outer step portions, said sand being in intimate and substantially complete surface contact with the soil contiguous thereto, whereby liquid supplied to the upper end portion of said core will seep through the sand to the soil of the respective outer step portions.

3. A terraced garden including a plurality of soil steps of downward progressively increasing outward lateral extent, said steps having inner upstanding soil walls, a sand core having upstanding sand portions contiguous to said walls, said core having laterally outward extending sand portions individually underlying and contiguous to the soil of the respective steps, the top of the soil of the respective steps over said sand portions being exposed, said sand being in intimate surface contact with the soil contiguous thereto, said core having an upper end portion exposed for the reception of liquid, and a sleeve projecting from the upper end portion of said core to conduct introduced liquid to the upper end portion of said core, whereby liquid introduced into said sleeve will seep through the sand to the soil of the respective steps.

4. A terraced garden including a plurality of soil steps of downward progressively increasing outward lateral extent, bands individually confining the respective steps, laterally outward extending sand portions individually underlying and contiguous to the soil of the respective steps and terminating adjacent the respective bands, the top of said soil over said sand portions being exposed, said sand portions being in intimate surface contact with the soil contiguous thereto, and means for supplying liquid to said sand portions for seepage through the sand to the soil of the respective steps.

5. A terraced garden including a plurality of soil steps of downward progressively increasing outward lateral extent, bands individually confining the respective steps, said steps having inner soil walls facing away from said bands, a sand core having portions contiguous to said walls, said core having laterally outward extending sand portions extending toward the respective bands and individually underlying and contiguous to the soil of the respective steps thereabove, the top of the soil over said outward extending sand portions being exposed, said sand being in intimate contact with the soil contiguous thereto, the upper end portion of said core being exposed, and a sleeve projecting from the upper end portion of said core to conduct introduced liquid to the upper end portion of said core, whereby liquid introduced into said sleeve will seep through the sand to the soil of the respective steps.

MARGARET L. ESMAY.
PAUL O. ESMAY.

References Cited in the file of this patent

UNITED STATES PATENTS

| Number | Name | Date |
| --- | --- | --- |
| 197,406 | Reinecke | Nov. 20, 1877 |
| 440,141 | Dearborn | Nov. 11, 1890 |
| 451,645 | Tudor | May 5, 1891 |
| 912,184 | Scott | Feb. 9, 1909 |
| 1,217,239 | Swartz | Feb. 27, 1917 |
| 1,268,649 | Velde | June 4, 1918 |
| 1,752,597 | Jackson | Apr. 1, 1930 |
| 2,181,016 | Gross | Nov. 21, 1939 |
| 2,316,892 | Saul | Apr. 20, 1943 |

FOREIGN PATENTS

| Number | Country | Date |
| --- | --- | --- |
| 162,055 | Switzerland | Aug. 16, 1933 |